United States Patent [19]

Otsuki et al.

[11] Patent Number: 5,485,069

[45] Date of Patent: Jan. 16, 1996

[54] NUMERICAL CONTROL APPARATUS

[75] Inventors: Toshiaki Otsuki, Minamitsuru; Kunihiko Murakami, Hino; Yorikazu Fukui, Suginami, all of Japan

[73] Assignee: Fanuc Ltd., Yamanashi, Japan

[21] Appl. No.: 318,728

[22] PCT Filed: Feb. 2, 1994

[86] PCT No.: PCT/JP94/00154

§ 371 Date: Oct. 13, 1994

§ 102(e) Date: Oct. 13, 1994

[87] PCT Pub. No.: WO94/19731

PCT Pub. Date: Sep. 1, 1994

[30] Foreign Application Priority Data

Feb. 25, 1993 [JP] Japan .................... 5-035924

[51] Int. Cl.$^6$ .................. G05B 19/403; G05B 19/18
[52] U.S. Cl. .................. 318/570; 318/571; 318/578; 364/474.16; 364/474.23
[58] Field of Search .................. 318/560–646; 364/474.01–474.35, 161–175, 475

[56] References Cited

U.S. PATENT DOCUMENTS

| | | | |
|---|---|---|---|
| 3,629,560 | 12/1971 | Slawson .................. | 318/570 |
| 4,484,286 | 11/1984 | Nagamine et al. .................. | 364/474 |
| 4,575,665 | 3/1986 | Matsuura et al. .................. | 318/578 |
| 4,689,541 | 8/1987 | Jones et al. .................. | 318/696 |
| 4,740,901 | 4/1988 | Otsuki .................. | 364/474 |
| 4,784,541 | 11/1988 | Umehara et al. .................. | 409/186 |
| 5,229,950 | 7/1993 | Niwa .................. | 364/474.23 |
| 5,291,416 | 3/1994 | Hutchins .................. | 364/474.16 |

FOREIGN PATENT DOCUMENTS

| | | |
|---|---|---|
| 2-24041 | 1/1990 | Japan . |
| 4-30988 | 2/1992 | Japan . |
| 4-260105 | 9/1992 | Japan . |

OTHER PUBLICATIONS

Patent Abstracts of Japan, vol. 7, No. 159 (M–228), Apr. 20, 1983.

Patent Abstracts of Japan, vol. 9, No. 198 (M–404), Aug. 15, 1985.

"Lasers Get the Measure of CNC Tools," Horak et al., European Machining, 4957, Kingston/Thames, GB, May/Jun. 1991, pp. 41, 43.

Patent Abstracts of Japan, vol. 13, No. 242 (P–880), Jun. 7, 1989.

*Primary Examiner*—Paul Ip
*Attorney, Agent, or Firm*—Staas & Halsey

[57] ABSTRACT

A numerical control apparatus which reduces a cycle time by executing the movement command of a next block without temporarily stopping the movement of a workpiece even if a skip signal is input. Upon receiving the skip signal SS output from a sensing device, a skip signal sensing device determines the present position of the workpiece, stores the position in a memory device and outputs a skip completion signal AS. Then, an acceleration/deceleration distribution device carries out pulse interpolation of a present block and outputs a distribution completion signal ES on the completion of the movement. Further, a preprocessing distribution device, having received the skip completion signal AS, determines an amount of movement of a next block from the present position of the workpiece and preprocesses the next block of the machining program. On receiving the distribution completion signal ES output from the acceleration/deceleration distribution device, the preprocessing distribution device outputs an interpolation pulse IP2 and moves the workpiece without interruption.

7 Claims, 5 Drawing Sheets

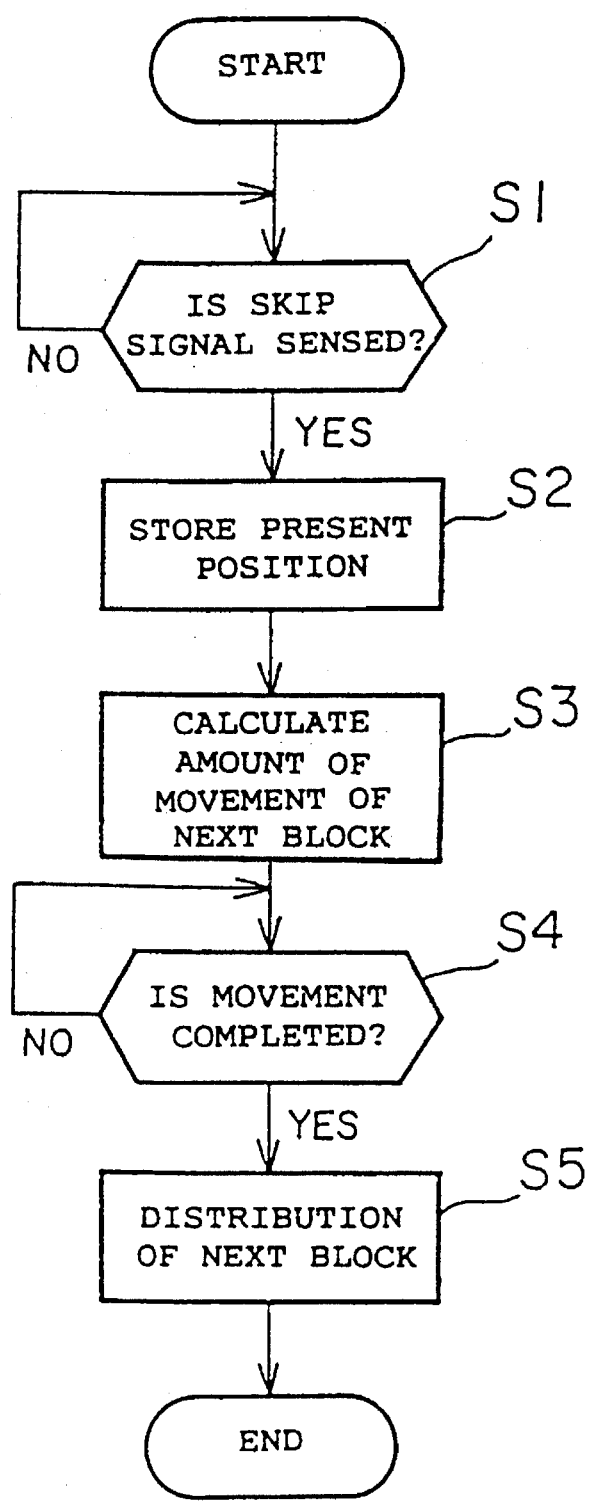
F I G. 5

5,485,069

NUMERICAL CONTROL APPARATUS

BACKGROUND OF THE INVENTION

1. Field of the Invention

The present invention relates to a numerical control apparatus provided with a skip function, and more specifically, to a numerical control apparatus for measuring a tool length and a workpiece configuration.

2. Description of the Related Art

In general, numerical control apparatuses are provided with a skip function for measuring a tool length and a workpiece configuration. The skip function is arranged such that when a skip signal is input from the outside by a contact type or non-contact type sensor having sensed the existence a workpiece and a tool, the numerical control apparatus stops an axis movement corresponding to the block of a machining program which is being executed at present and goes to a next block of the machining program (hereinafter, simply referred to as "a next block").

Consequently, when an amount of movement is not known because a cutting depth, for example, is not given in grinding machines, lathes and other machines, the amount of movement can be measured by making effective use of the skip function.

Nevertheless, when a conventional numerical control apparatus provided with the skip function is supplied with a skip signal from the outside, since the numerical control apparatus temporarily stops the movement of a workpiece and tool and then executes the movement command of a next block, a considerable period of time is needed to reach a feed speed for the movement of the next block. Thus, a problem arises in that a cycle time is increased.

SUMMARY OF THE INVENTION

Taking the above into consideration, an object of the present invention is to provide a numerical control apparatus which executes a command for the movement of a next block without temporarily stopping the movement of a workpiece and tool, even if a skip signal is input so as to reduce a cycle time.

To solve the above problem, according to the present invention, there is provided a numerical control apparatus for measuring a tool length and a workpiece configuration by a skip function, which comprises a memory device for storing a time constant used when a feed speed of a workpiece and tool is accelerated or decelerated and storing a machining program, skip signal sensing device for receiving a skip signal from a sensing device, processing the skip signal to determine a present position and sending the present position of the workpiece and tool to a predetermined storing region of the memory device as well as outputting a skip completion signal, acceleration/deceleration distribution device for outputting a first interpolation pulse for accelerating or decelerating the feed speed based on the time constant and the present position in response to the skip completion signal and outputting a distribution completion signal after the workpiece and tool have been moved to an end position commanded in the present block of the machining program, and preprocessing distribution device for determining an amount of movement of a next block from the present position of the workpiece and tool in response to the skip completion signal, preprocessing the next block of the machining program and outputting a second interpolation pulse based on the preprocessing in response to the distribution completion signal.

The memory device stores the time constant used when a feed speed of the workpiece and tool is accelerated or decelerated and the machining program.

First, the skip signal sensing device having received a skip signal output from the sensing device, determines the present position of the workpiece and tool which is stored in a predetermined memory region of the memory device as well as outputs a skip completion signal.

The acceleration/deceleration distribution device moves the workpiece and tool to an end position commanded by the present block in the machining program and then outputs a movement completion signal. Further, the preprocessing distribution device having received the skip completion signal determines an amount of movement of a next block from the present position of the workpiece and tool, preprocesses the next block of the machining program and outputs a second interpolation pulse based on the preprocessing in response to a distribution completion signal.

BRIEF DESCRIPTION OF THE DRAWINGS

FIG. 5 is a flowchart showing a processing sequence of the present invention.

DETAILED DESCRIPTION OF THE PREFERRED EMBODIMENTS

An embodiment of the present invention will be described below with reference to the drawings.

Figure 1:
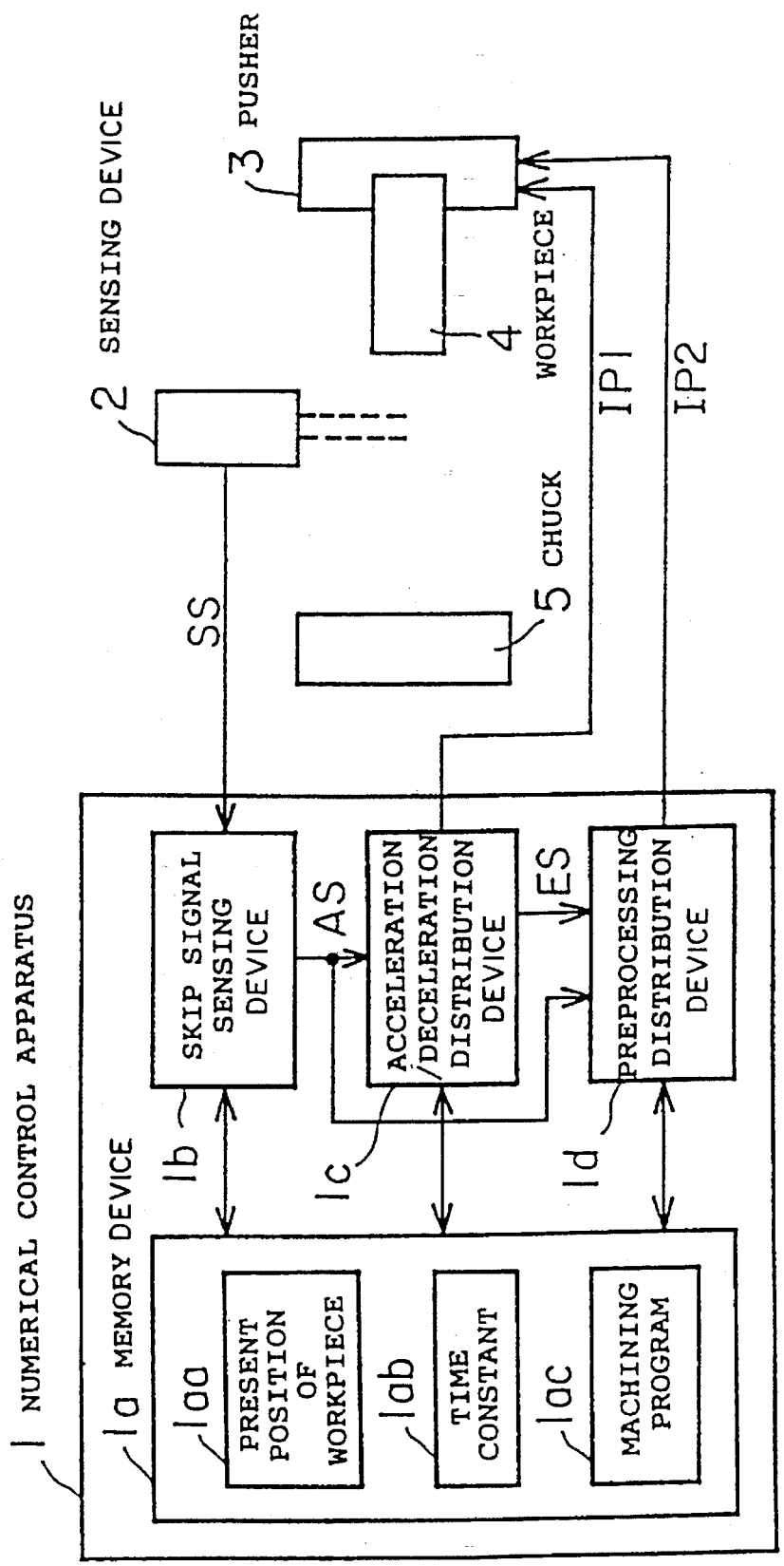
FIG. 1 is a block diagram explaining the principle of the present invention.

FIG. 1 is a block diagram explaining the principle of the present invention as well as explaining an embodiment of the present invention. In FIG. 1, a numerical control apparatus 1 of the present invention includes the respective components of memory device 1a, skip signal sensing device 1b, acceleration/deceleration distribution device 1c and preprocessing distribution device 1d.

Figure 2:
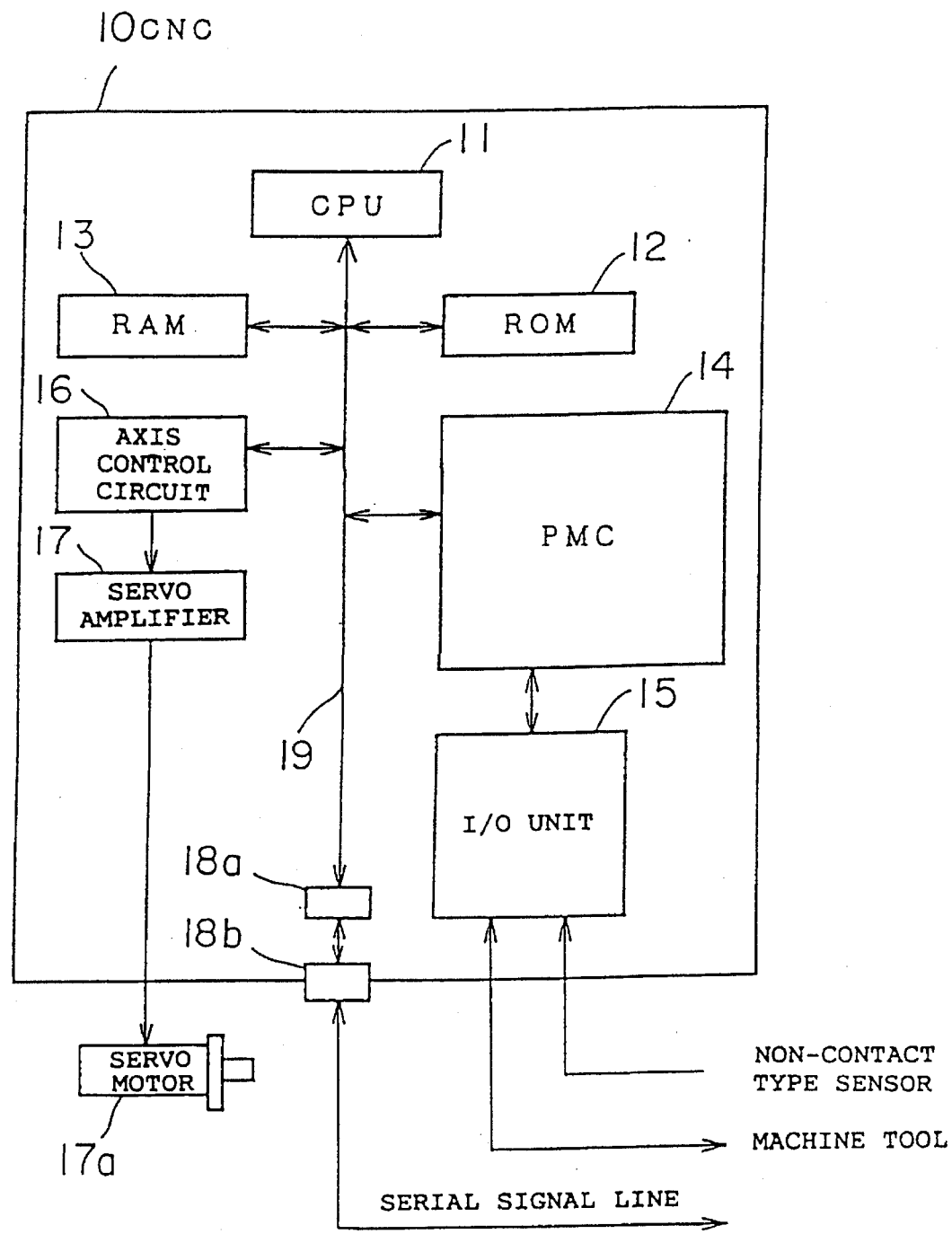
FIG. 2 is a block diagram showing the overall arrangement of a one-axis numerical control apparatus.

As shown in FIG. 2, the memory device 1a is composed of a RAM 13 and, as shown in FIG. 1, stores a time constant 1ab used when a feed speed of a workpiece 4 is accelerated/decelerated, the present position 1aa of the workpiece 4 and a machining program 1ac. Note, the time constant 1ab can command acceleration/deceleration of a feed speed according to machining conditions by being set by a parameter.

First, the skip signal sensing device 1b, having received a skip signal SS output from sensing device 2, processes the signal to determine a present position, and the present position 1aa of the workpiece 4 is stored in the memory device 1a, as well as outputs a skip completion signal AS. The sensing device 2 is composed of a non-contact type sensor such as a laser sensor, a sound sensor or the like.

The acceleration/deceleration distribution device 1c having received the skip completion signal AS moves the workpiece 4 to an end position commanded by the present block without temporarily stopping the workpiece 4 and outputs a distribution completion signal ES.

Further, the preprocessing distribution device 1*d* having received the skip completion signal AS determines an amount of movement of a next block from the present position 1*aa* of the workpiece 4 simultaneously with the above movement and preprocesses a next block of the machining program 1*ac*. Then, the preprocessing distribution device 1*d* receives the distribution completion signal ES output from the acceleration/deceleration distribution device 1*c*, outputs an interpolation pulse IP2 and moves the workpiece 4 to an end position commanded by the next block in the machining program 1*ac* without temporarily stopping the workpiece 4.

Consequently, even if a workpiece configuration is measured by inputting the skip signal SS, the workpiece 4 can be moved without being temporarily stopped so that a cycle time can be reduced.

Next, a specific hardware arrangement of the numerical control apparatus 1 will be described.

FIG. 2 is a block diagram showing the overall arrangement of a one-axis CNC (numerical control apparatus) as the numerical control apparatus 1. In FIG. 2, the one-axis CNC 10 includes a CPU (processor) 11, a ROM 12, a RAM 13, a PMC (programmable machine controller) 14, an I/O (input/output) unit 15, an axis control circuit 16, a servo amplifier 17, a buffer 18*a* and a connector 18*b*.

The CPU 11 controls the one-axis CNC 10 in its entirety according to a system program stored in the ROM 12. The RAM 13 is composed of an SRAM or the like and backed up by a battery not shown. Therefore, even if a power supply to the one-axis CNC 10 is shut off, data stored in the RAM 13 is maintained as it is. The RAM 13 stores various data such as the present position 1*aa* of the workpiece 4, the time constant 1*ab*, the machining program 1*ac* and the like.

Note, in the relationship with the respective components shown in FIG. 1, the skip signal sensing device 1*b*, the acceleration/deceleration distribution device 1*c* and the preprocessing distribution device 1*d* shown in FIG. 1 are functions realized by the CPU 11 that executes one of the system programs stored in the ROM 12.

By a sequence program created in a ladder form, the PMC 14 controls a machine tool through the I/O unit 15 to be described later. More specifically, the PMC 14 converts respective command functions such as an M function, S function, T function and the like commanded by the machining program 1*ac* into signals necessary to operate a machine tool through the sequence program and outputs the signals. Magnets, hydraulic valves, electric actuators and the like of the machine tool are driven in response to the signals output at this time. Further, the PMC 14 receives signals from limit switches of the machine tool and switches and the like of a machine control panel and carries out a predetermined processing.

Further, the PMC 14 receives the skip signal SS output from the laser sensor or the sound sensor as the non-contact type sensor serving as the sensing device 2 through the I/O unit 15. Then, the PMC 14 converts the received skip signal SS into a predetermined data format and sends it to the CPU 11. Note, the CPU 11 may directly read the skip signal through the I/O unit 15.

The axis control circuit 16 receives a movement command of a control axis (X-axis) from the CPU 11 and drives a servo motor 17*a through the servo amplifier 17*. The buffer 18*a* is connected to the connector 18*b* and a data packet including an instruction command is sent from the connector 18*b* to a serial signal line.

Next, operation of the present invention will be described with reference to FIGS. 3 to 5. To make the description simple, a case in which a workpiece configuration is measured in a lathe will be described here.

Figure 3:
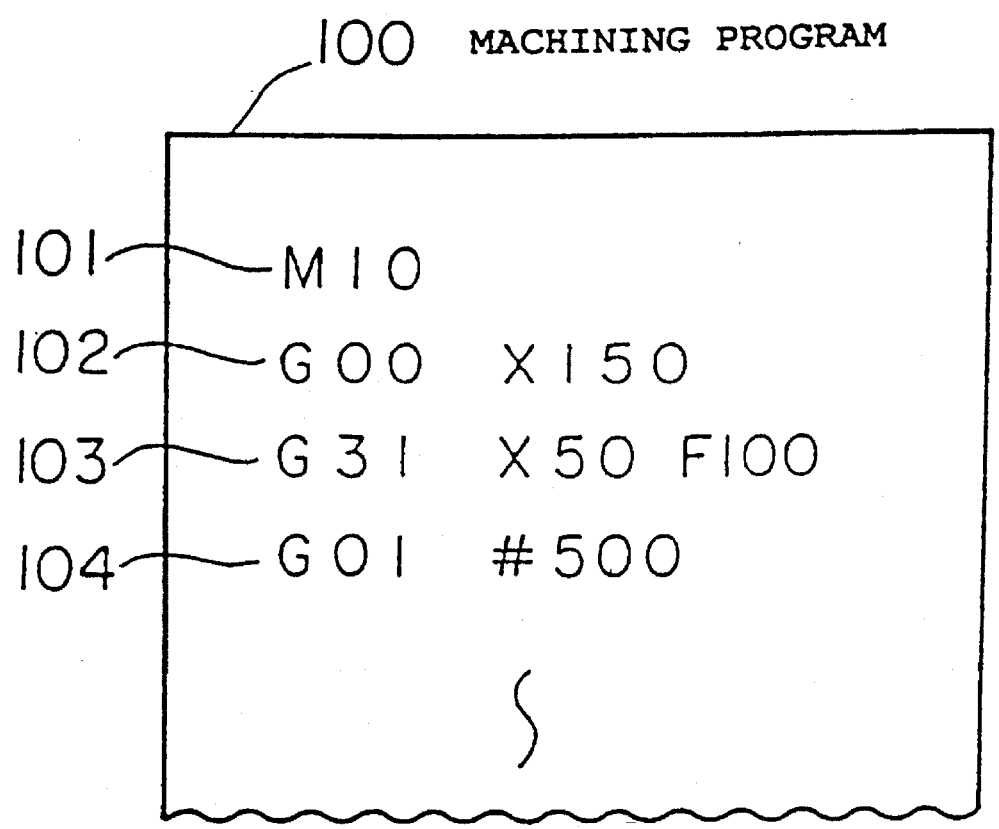
FIG. 3 is a view showing an example of a machining program.

FIG. 3 is a view showing an example of a machining program. The machining program 100 is a portion of the machining program 1*ac* shown in FIG. 1 and composed of 4 lines from a block 101 to a block 104 for executing operation commands.

At the block 101, a series of operations is commanded by an M function "M10" such that the new workpiece 4 is loaded and clamped by a clamp and then gripped by a pusher 3 and the clamped workpiece 4 is released as described later.

At the block 102, an X-coordinate is quick fed to "150" and positioned there by a G function "G00". At the block 103, an operation command for measuring the workpiece configuration, i.e., a skip function command is issued by a G function "G31" so that the X-coordinate is moved to "50" at a feed speed "100" (ram/rain) by an F function "F100".

Note, "#500" in the block 104 means the 500th macro variable. Consequently, the X-coordinate is positioned at the position of a numerical value stored in the macro variable "500" by a G function "G01". Although the blocks following the above blocks are not shown, ordinary lathe turning operation commands will be executed.

The positional relationship of the pusher 3 and the workpiece 4 which is changed by a series of the operation commands of the machining program 100 will be described with reference to FIG. 1 and FIG. 3.

Figure 4A:
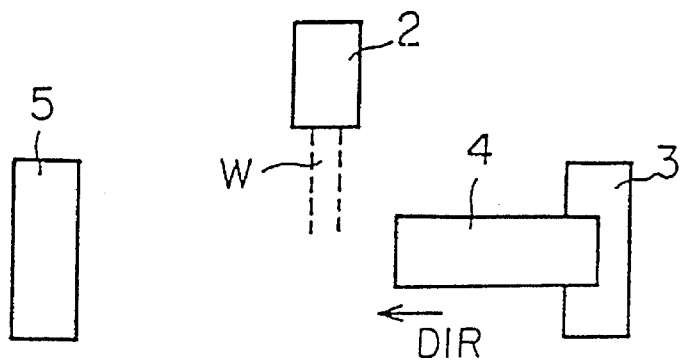
FIGS. 4(A), 4(B), 4(C), a (D) are views showing states of movement of a workpiece gripped by a pusher.
Figure 4B:
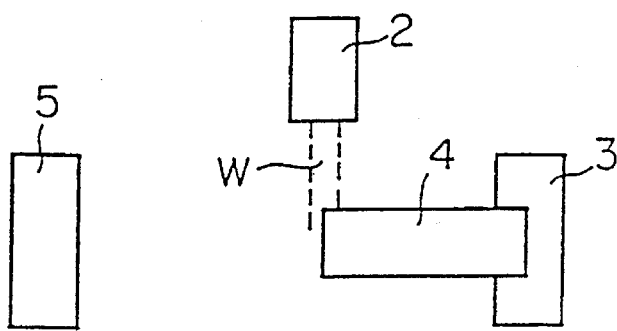
Figure 4C:
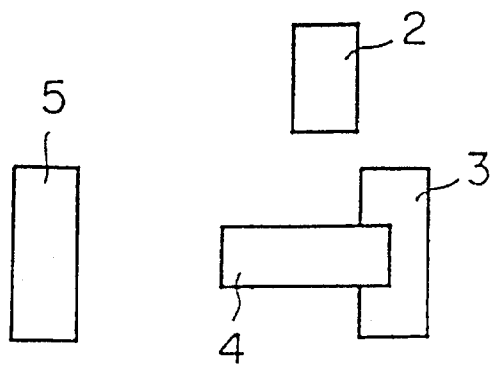
Figure 4D:
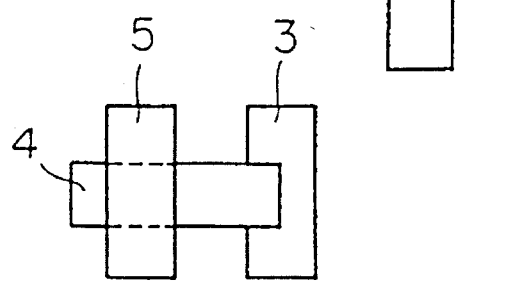

FIGS. 4(A), 4(B), 4(C), and 4(D) are views showing states of movement of the workpiece 4 gripped by the pusher 3. FIG. 4(A) shows a state that the newly loaded workpiece 4 is gripped by the pusher 3, FIG. 4(B) shows a state that the workpiece 4 is sensed by the sensing means 2, FIG. 4(C) shows a state that the workpiece 4 has moved to the X-coordinate commanded by the operation command at the block 103 of FIG. 3, and FIG. 4(D) shows a state that the workpiece 4 has finally moved to the X-coordinate commanded by the operation command at the block 104 of FIG. 3. Note, the workpiece 4 is, for example, a columnar metal raw material.

In FIG. 4(A), first, the newly loaded workpiece 4 is gripped by the pusher 3 in response to the operation command issued at the block 101 of FIG. 3. Then, the workpiece 4 is quick fed up to the X-coordinate "150" and positioned there in response to the operation command issued at the block 102. Specifically, the workpiece 4 is positioned so that the right end of the workpiece 4 is positioned at the X-coordinate "150" in the drawing. Thus, a measurement start point for measuring the configuration of the workpiece 4 is set.

Then, a sensing wave W for sensing the workpiece 4 as an object to be sensed is output from the sensing device 2 in response to the operation command issued at the block 103 of FIG. 3, and then the pusher 3 and the workpiece 4 move in a moving direction DIR at a feed speed "100" (mm/min").

In FIG. 4(B), the sensing wave W impinges on the workpiece 4 and the sensing device 2 senses the left end of the workpiece 4 by the reflection of the sensing wave and outputs the skip signal SS shown in FIG. 1. The memory device 1*a* stores the X-coordinate of the left end position of the workpiece 4 in the macro variable "500" of the memory device 1*a* as the present position 1*aa* of the workpiece 4 in response to the skip signal SS and outputs the skip completion signal AS. Note, a length of the workpiece 4 can be determined by the X-coordinate "100" of the sensing device 2 and the X-coordinate of the right end position of the workpiece 4 in FIG. 4(B). For example, when the X-coordinate of the right end position of the workpiece 4 in FIG. 4(B) is "130", the length of the workpiece 4 is 130–100=30. Note, the X- coordinate "100" of the sensing device 2 is to be previously measured. Further, the right end position of the workpiece 4 in FIG. 4(B) is recognized as a present position in the interior of the numerical control apparatus.

Further, even if the skip completion signal AS is received, since the acceleration/deceleration distribution device 1c distributes an interpolation pulse IP1 up to an end position, the pusher 3 and the workpiece 4 move in the moving direction DIR without being temporarily stopped. When the pusher 3 and the workpiece 4 move, the preprocessing distribution device 1d preprocesses a next block of the machining block 100, i.e., the block 104.

FIG. 4(C) shows a state that the workpiece 4 has moved to the X-coordinate "50" commanded by the operation command at the block 103 of FIG. 3. and the acceleration/ deceleration distribution device 1c outputs a distribution completion signal ES at this time. The preprocessing distribution device 1d having received the distribution completion signal ES outputs an interpolation pulse IP2 and moves the workpiece 4 to an end position commanded at the block 104 of FIG. 3 without temporarily stopping the workpiece 4. Specifically, the preprocessing distribution device 1d moves the workpiece 4 up to the position of a numerical value (the above mentioned 30 mm) stored in the macro variable "500" without temporarily stopping it. FIG. 4(D) shows a state that the movement of the workpiece 4 has been finished as described above.

Next, a processing sequence of the present invention will be described.

FIG. 5 is a flowchart showing the processing sequence of the present invention. In FIG. 5, each numeral following the letter "S" represents a step number. Note, steps S1 and S2 are executed by the skip signal sensing device 1b, steps S3 and S4 are executed by the acceleration/deceleration distribution device 1c and step S5 is executed by the preprocessing distribution device 1d.

[S1] It is determined whether or not a skip signal SS output from the sensing device 2 is sensed. When the skip signal SS is sensed (YES), the process goes to step S2, whereas when the skip signal SS is not sensed (NO), step S1 is repeated.

[S2] The present position 1aa, e.g., the X-coordinate of the workpiece 4 at the time when the skip signal SS is sensed at step S1 is stored in the memory device 1a.

[S3] An amount of movement at a next block (an amount of movement to be stored in the macro variable #500 of the block 104 of FIG. 3) is determined based on the present position of the workpiece 4 stored in the memory device 1a and the X-coordinate of the sensing device 2 while a movement command of the present block is executed.

[S4] It is determined whether the workpiece 4 has moved to the end position commanded by the present block in the machining program 1ac or not. When the workpiece 4 has moved to the end position (YES), the distribution completion signal ES is output and the process goes to step S5, whereas when the workpiece 4 has not yet moved there (NO), step S4 is repeated.

[S5] An interpolation pulse IP2 is output in response to the distribution completion signal ES output at step S4 and the workpiece 4 is moved to the end position commanded by a next block in the machining program 1ac without being temporarily stopped.

Since the workpiece 4 is moved without being temporarily stopped even if a workpiece configuration is measured in response to the skip signal SS, a cycle time can be reduced. Further, since the memory device 1a is composed of the non-volatile RAM 13, even if a power supply to the numerical control apparatus 1 is shut off by a power outage or the like, the present position 1aa of the workpiece 4, the time constant 1ab and the machining program 1ac can be maintained without being lost.

The present invention is applied to the measurement of the workpiece configuration in a lathe in the above description. Furthermore, it can be also applied to a grinding machine having two or more axes controlled simultaneously in the same way if the position information of the corresponding number of axes is stored as the present position 1aa of the workpiece 4.

Further, the present invention can be also applied to the measurement of a tool length in the same way in addition of the measurement of the workpiece configuration.

Although the sensing device 2 is composed of the non-contact type sensor such as the laser sensor, the sound sensor or the like, it may be composed of a contact type sensor such as a micro switch and the like provided with a bar-shaped switch knob.

Although the time constant 1ab is set by the parameter, it may be set by a predetermined address, a comment sentence or the like in the machining program 1ac. With this arrangement, acceleration and deceleration can be strictly commanded for each machining process in the machining program 1ac.

As described above, according to the present invention, the time constant and the machining program are stored in the memory device, the skip signal sensing device having received a skip signal output from the sensing device determines the present position of a workpiece which is stored in a predetermined storing region of the memory device as well as determines an amount of movement of a next block based on the present position of the workpiece and the preprocessing distribution device preprocesses the next block of the machining program. Therefore, even if a tool length and a workpiece configuration are measured, the workpiece can be moved without being temporarily stopped and a cycle time can be reduced.

We claim:

1. A numerical control apparatus for measuring a tool length and a workpiece by a skip function, comprising:

memory means for storing a time constant used when a feed speed of a workpiece is accelerated or decelerated and for storing a machining program;

skip signal sensing means for determining a present position of said workpiece in response to a skip signal output from a sensing device and for outputting a skip completion signal, said memory means storing said present position in a predetermined region;

acceleration/deceleration distribution means for outputting a first interpolation pulse for accelerating or decelerating the feed speed of the workpiece based on said time constant and said present position in response to said skip completion signal and for outputting a distribution completion signal after said workpiece moves to an end position commanded in a present block of said machining program; and preprocessing distribution means for determining an amount of movement of a next block of said machining program from the present position of said workpiece in response to said skip completion signal, for preprocessing the next block of said machining program and for outputting a second interpolation pulse for accelerating or decelerating the feed speed of the workpiece based on said preprocessing of the next block in response to said distribution completion signal.

2. A numerical control apparatus according to claim 1, wherein said sensing means includes a non-contact type sensor.

3. A numerical control apparatus according to claim 1, wherein said memory means includes a non-volatile memory.

4. A numerical control apparatus according to claim 1, wherein said predetermined region of said memory means is a macro variable region.

5. A numerical control apparatus according to claim 1, wherein said time constant is set by a parameter.

6. A numerical control apparatus according to claim 2, wherein said non-contact type sensor is a laser sensor.

7. A numerical control apparatus according to claim 2, wherein said non-contact type sensor is a sound sensor.

* * * * *

UNITED STATES PATENT AND TRADEMARK OFFICE
CERTIFICATE OF CORRECTION

PATENT NO. : 5,485,069
DATED : January 16, 1996
INVENTOR(S) : Toshiaki OTSUKI et al.

It is certified that error appears in the above-indentified patent and that said Letters Patent is hereby corrected as shown below:

Column 2, line 31, delete "a(D)" and insert —4(D)—.

Signed and Sealed this

Second Day of April, 1996

Attest:

BRUCE LEHMAN

*Attesting Officer*  *Commissioner of Patents and Trademarks*